United States Patent [19] | [11] 3,711,817
Carter et al. | [45] Jan. 16, 1973

[54] ELECTRICAL JUNCTION SYSTEM

[75] Inventors: Clyde Thomas Carter, Mechanicsburg; Homer Ernst Henschen, Carlisle, both of Pa.

[73] Assignee: AMP Incorporated, Harrisburg, Pa.

[22] Filed: Nov. 24, 1969

[21] Appl. No.: 879,451

[52] U.S. Cl...............................339/121, 339/126 R
[51] Int. Cl...............................H01r 13/62
[58] Field of Search............339/18, 19, 17, 121, 126; 317/101 DH

[56] References Cited

UNITED STATES PATENTS

| | | | |
|---|---|---|---|
| 2,714,713 | 8/1955 | Parajon | 339/164 M |
| 3,458,767 | 7/1969 | Hedger et al. | 339/17 M |
| 3,227,989 | 1/1966 | Wilm et al. | 339/18 |
| 3,267,333 | 8/1966 | Schultz | 339/17 M X |
| 3,300,686 | 1/1967 | Johnson et al. | 317/101 H |
| 3,489,954 | 1/1970 | Humphrey, Jr. et al. | 317/101 |

*Primary Examiner*—Richard E. Moore
*Attorney*—Curtis, Morris and Safford, Marshall M. Holcombe, William Hintze, William J. Keating, Frederick W. Raring, John R. Hopkins, Adrian J. La Rue and Jay L. Seitchik

[57] ABSTRACT

Electrical junction system comprises a frame on which are mounted a plurality of electrical connectors and a panelboard. The panelboard has a multiplicity of contact terminal pins extending therethrough, one end of each pin being engaged with a contact terminal in one of the connectors. The other ends of the pins are interconnected to form interconnections among the conductors extending to the connectors. First and second guide and locating means on the frame accurately locate the connectors and the panelboard with respect to the frame so that the individual contact terminals in the connectors and in the panelboard are accurately located with respect to each other thereby to permit removal of, and assembly to, the panelboard to the frame while the connectors are mounted in the frame. Additionally, the dual locating means permits removal of the connectors from the frame, and assembly of the connectors to the frame, while the panelboard is mounted on the frame.

17 Claims, 9 Drawing Figures

ELECTRICAL JUNCTION SYSTEM

BACKGROUND OF THE INVENTION

The present invention relates to electrical junction systems of the type which can be used on equipment having relatively complex electrical systems and requiring interconnections among the conductors of the systems.

It is an object of the invention to provide an improved electrical junction system. A further object is to provide an electrical junction system which is capable of accommodating, and providing electrical interconnections for, different types of electrical conductors. A further object is to provide an electrical junction system which permits the formation of the interconnections between conductors extending to the system by point-to-point wiring techniques. A still further object is to provide an electrical junction system which is easily serviced in a short time.

These and other objects of the invention are achieved in one preferred embodiment thereof which is briefly described in the foregoing abstract, which is described in detail in the specification which follows, and which is shown in the accompanying drawings in which:

FIG. 3 is a view similar to FIG. 2 but showing one of the connectors removed from the frame means.

A preferred form of electrical junction system in accordance with the invention comprises a frame means generally indicated at 2 which is mounted in a panel 4 and to which various conductors 19, 34, 38 extend for interconnection. The panel 4 may be a panel in an aircraft or in the housing of a machine as will be explained below.

Figures 5, 6, 7:
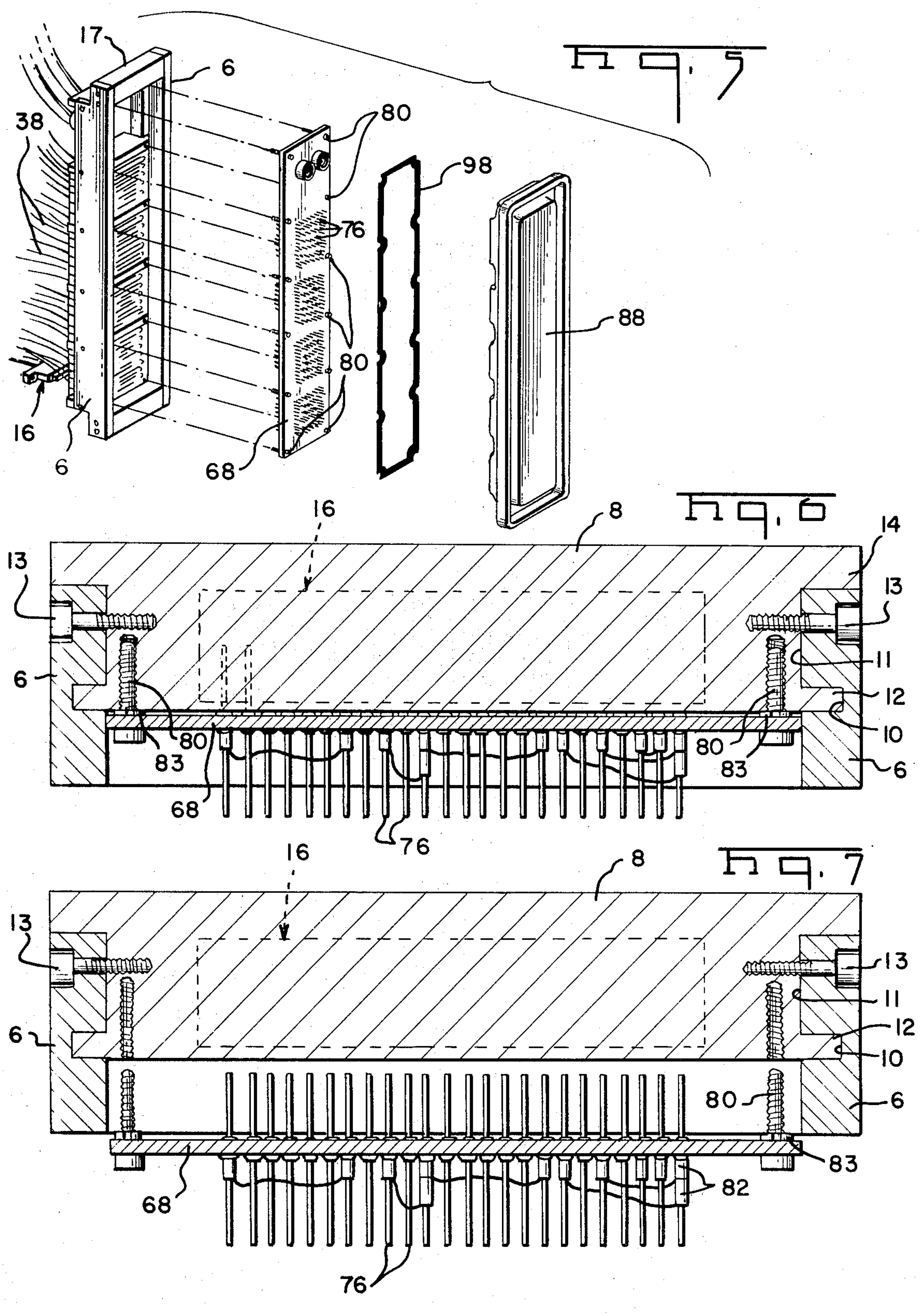
FIG. 5 is an exploded perspective view of the terminal junction system of FIG. 1 showing the opposite side of the frame from the side shown in FIG. 1.
FIG. 6 is a view taken along the lines 6—6 of FIG. 1 but with the back cover plate of the system removed.
FIG. 7 is a view similar to FIG. 6 but illustrating the function of the jack screws for removing the panelboard from the frame of the system.

Frame means 2 comprises a pair of spaced-apart parallel side rails 6 and a plurality of transverse frame members 8, the end ones of these frame members 8' and mounting bars 17 defining the ends of the frame means. As shown best in FIG. 6, ears 12 extend from the opposite sides of the transverse frame members 8 at their lower ends and are received within elongated grooves 10 in the opposed faces 11 of the side rails 6. Ears 14 are provided on the upper portions of the frame members 8 and extend over the surfaces of the side rails as is also shown in FIG. 6.

The transverse frame members 8 are secured to, and accurately positioned in, the frame by means of fasteners 13 which extend through the side rails and into the frame members. The frame assembly is mounted in an opening in the panel 4 by means of mounting bars 17 provided at each end of the frame means and secured to the panel by fasteners 19. The mounting bars 17 extend between extensions 15 of the side rails 6 and are secured to these extensions by suitable fasteners as shown.

Figure 1:
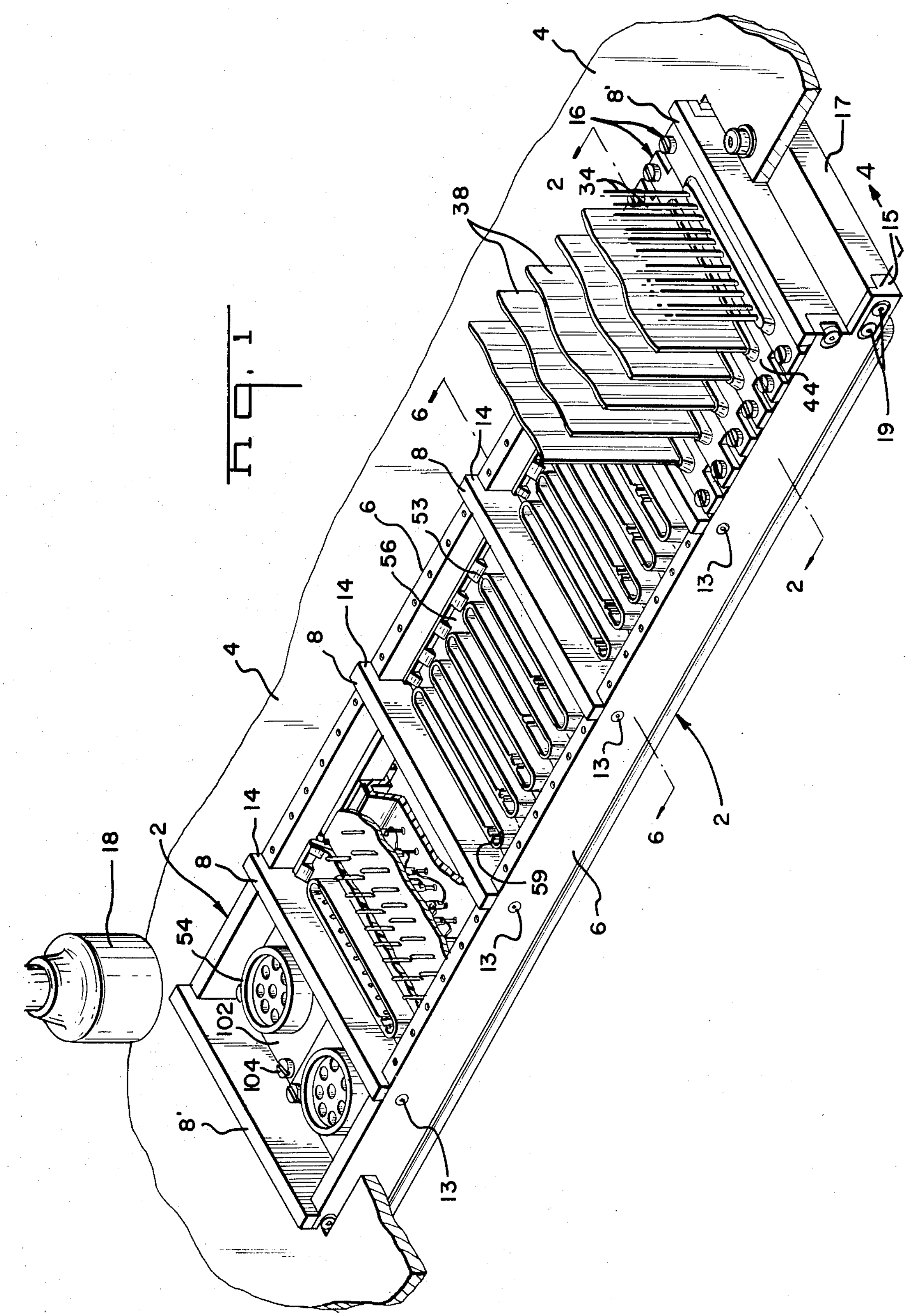
FIG. 1 is a perspective view of a terminal junction system in accordance with the invention.
Figures 1, 2:
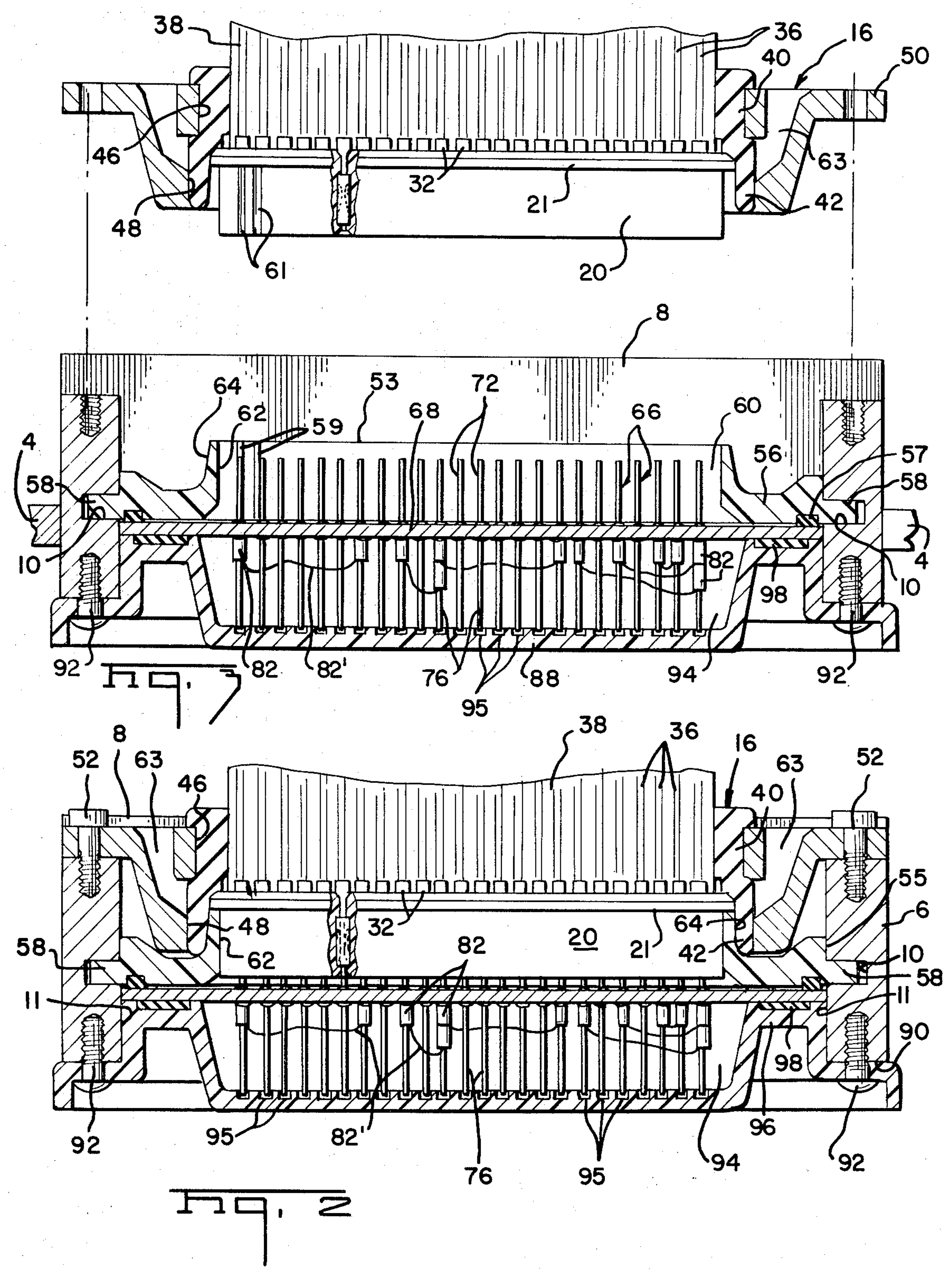
FIG. 2 is a section view taken along the lines 2—2 of FIG. 1.

A plurality of rectangular multi-contact electrical connectors 16 are mounted on the frame on the upper side thereof, as viewed in FIG. 1, and one or more conventional circular connectors 18 may also be incorporated into the system as will be described below. Each rectangular connector 16 comprises (FIGS. 3 and 4) a generally prismatic insulating housing 20 having an enlarged upper end 21 as viewed in FIG. 3 which defines a downwardly facing shoulder. A plurality of contact receiving cavities 22 are provided in the housing and suitable contact terminals 24 are mounted in these cavities. The lower ends of these cavities, which communicate with the mating face 28 of the housing are somewhat enlarged to facilitate the entrance of contact terminals which are mounted in a panelboard described below. The contact terminals 24 in the housing 20 may be of any suitable type, the disclosed embodiment of the invention having contact sockets of the type described in patent to Evans U.S. Pat. No. Re 26646 mounted in its cavities which are adapted to receive the upper ends 72 of contact pins. The contact terminals in the cavities in connector housing 20 should be of a design such that they will adapt themselves to contact pins 72 when the connector is mated to the frame as will be described below.

Figure 4:
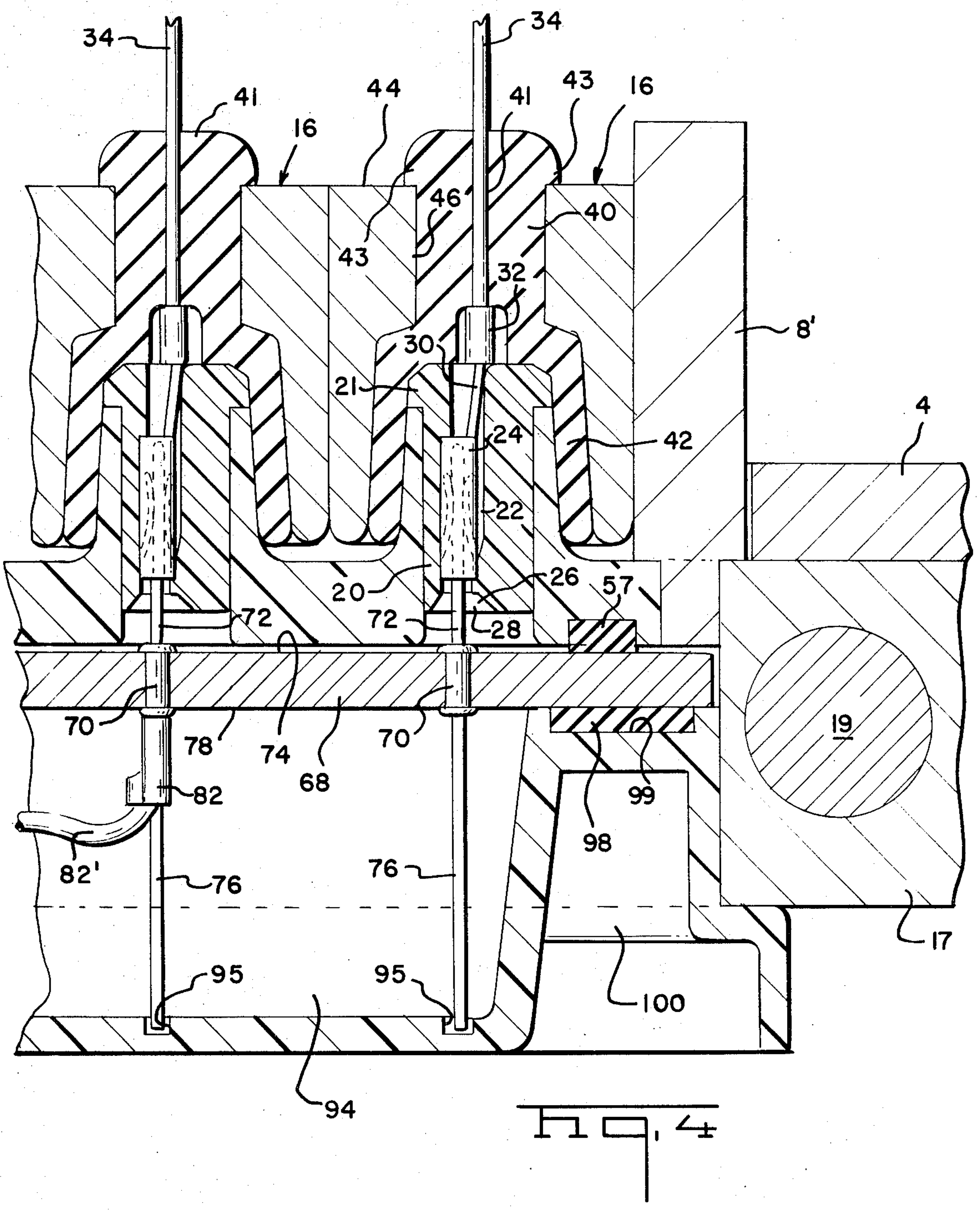
FIG. 4 is an irregular sectional view on an enlarged scale looking in the direction of arrow 4 of FIG. 1.

As best shown in FIG. 4, each contact terminal 24 has an integral neck section 30 extending from its upper end which merges with a crimp portion 32 by means of which the terminal is secured to a conductor. The conductor may be of any type commonly used in harnessing operations; for example, the connector at the extreme righthand end of the frame in FIG. 1 has its terminals crimped onto conventional insulated wires 34 while the adjacent connectors have their terminals crimped onto the conductors 36 of flat conductor cables 38. Other types of conductors or conductor cables, such as twisted wire pairs or ribbon cables can also be used in junction systems in accordance with the invention conductors of different types can be intermixed in the same connector if desired.

The insulating housing 20 of the connector is surrounded by a sealing gland 40 of suitable compressible resilient material such as silicon rubber which surrounds the conductors leading into the connector at 41 and forms a seal between the external surfaces of these conductors and the interior of the junction system when it is mounted in the frame. The sealing gland 40 has a depending skirt 42 which extends downwardly as viewed in FIG. 3 beyond the enlarged upper end 21 of the housing 20 and which surrounds, and is spaced from, the surface of the housing. Each connector further comprises a metallic shell 44 having an elongated central opening 46 in which the sealing gland and the housing 20 are contained. The lower portion of this opening 48 is somewhat enlarged for the accommodation of the depending skirt portion 42 of the sealing gland. The upper end of the sealing gland extends laterally over the upper surface of the shell as shown at 43 so that the parts will remain firmly in place. The individual connectors are secured to the frame by means of suitable fasteners 32 which extend through openings in ears 50 at the ends of the shell and are threaded into threaded openings on the upper edges of the side rails 6.

The rectangular connectors 16 are precisely located in the frame by means of receptacles 53 provided and a receptacle plate 56 which is mounted between the side rails 6 and the transverse frame members 8. As will be pointed out below this receptacle plate forms part of the frame means of the disclosed embodiment. Referring to FIG. 3, these receptacle plates have marginal edge portions 58 which are received within the previously identified grooves 10. Plates 56 are also advantageously provided with spaced-apart bosses 59 defining outwardly facing surfaces 55 which bear against the surfaces of the side rails to prevent any substantial movement of the receptacle plates 56 towards and away from the side rails. As shown in FIG. 1, one receptacle plate is provided in the enclosure defined by each adjacent pair of transverse frame members 8 (excepting, of course, the space occupied by the circular connectors at the lefthand end of the frame means).

Each receptacle plate 56 has a plurality (six in the disclosed embodiment) of elongated openings 60 into which one row of contact pins 72 extend, these pins being mounted in a panelboard described hereinbelow. The receptacle plates have upstanding walls 62 which surround and define each of the openings 60 and which have tapered outer surfaces 74 adapted for cooperation with the inner surfaces of the skirt portions 42 of the sealing glands. The walls 62 thus define the individual receptacles as noted above. It will be apparent from FIG. 4 that when the housing portion 20 of an individual connector is inserted into the appropriate opening 60 of one of the receptacle plates 56, the ends 72 of the contact pins will be disengageably coupled to the contact terminals 24 in the connector housing. Each housing 20, and its conductors, is circumferentially sealed by the gland 40, the inner surface of the skirt portion of which bears against the external surface 64 of the wall 62. Preferably, the surface 64 has a somewhat greater slope than the slope of the internal surface of the skirt 42 so that the skirt will be circumferentially stretched when the connector applied to the receptacle thereby adding to the efficacy of the seal. A slope of about 7° on the wall surface 64 and 3° on the internal surface of the skirt, for example, will cause the skirt to be stretched by an adequate amount. The seal is also enhanced by vents 63 in the shell 44 which permit the pressure of the atmosphere to bear against the external surface of the sealing gland 40 as will be explained below. As will also be pointed out below, additional seals are provided between the receptacle plates and the panelboard and between the panelboard and the back cover member so that the entire system is sealed from the atmosphere.

It is desirable to polarize and key the individual connectors 16 to prevent their being assembled to the system in positions other than their proper and intended positions. Such polarization and keying is achieved in the disclosed embodiment by integral ribs 59 on the internal surfaces of the receptacle walls 62 and the slots 61 on the external surface of housing 20. Each connector and receptacle is provided with uniquely located slots and ribs to prevent mounting of the connector in any position other than its intended position.

As previously noted, contact pins 66 are mounted in a panelboard 68 which is also contained in the frame. Preferably, the panelboard 68 is of suitable light metal such as aluminum and the contact pins are mounted in openings in the panelboard by means of insulating bushings 70. The lower ends 76 of the contact pins extend downwardly as viewed in FIG. 4 beyond the undersurface 78 of the panel and the interconnections between the conductors extending into the junction system are achieved by means of conductors 82′ which are connected as by clip type or wrap type electrical connections 82 to the posts 76. The panelboard is held in the frame by screws 80 (FIGS. 6 and 7) which extend through openings in the panelboard and are threaded into openings in the transverse frame members 8. In the embodiment shown, these screws are captive, that is they are freely rotatable in openings in the panelboard but are restrained from axial movement by split ring washers 83. By virtue of this arrangement, the screws 80 function as jack screws in that when it is desired to remove the panelboard from the frame while all of the connectors in place, it is merely necessary to loosen the jack screws 80 to cause relative downward movement of the panelboard from the position of FIG. 6 to the position of FIG. 7. The use of jack screws in this manner is highly advantageous because of the large number of contact posts which engaged with, and disengaged from the contact sockets when the panelboard is assembled to, or removed from the frame. The insertion force required to insert a single contact post into one of the contact sockets 24 is quite low however, when several hundred contact posts are provided on the panelboard the amount of force required for the inserting operation can be quite high. Furthermore, the use of jack screws as indicated ensures that the panelboard will be removed with its surface parallel to the mating faces of the connectors thereby avoiding the possibility of damage to either the terminal posts 72 or the contact receptacles 24 during assembly of the panelboard to the frame. Jack screws may not be required where smaller number of contact terminals are involved or where the insertion force for the contact terminals is extremely low.

It should be explained at this point that the panelboard 68 is precisely located in the frame by careful control of the dimensions of the panelboard, the side rails 6, and the transverse frame members 8. The terminal posts 66 which are mounted in the panelboard are also precisely located on its surface so that the final locations of the terminal posts with respect to the frame are precisely fixed. As will be explained below, such precise location of the terminal members in the panelboard is necessary to achieve one of the more important advantages of the invention.

A cover plate 88 is provided on the underside 78 of the panelboard and has a relatively deep dished center section 94 into which the lower ends 76 of the contact posts extend. In the disclosed embodiment, shallow recesses 95 are provided on the internal surface of the cover plate at locations corresponding to the locations of the terminal posts, to prevent undue lateral movement of these posts under the influence of vibration and thereby prevent deterioration of the electrical connections between the conductors 80 and the posts 76. The marginal portions of the cover plate are recessed as shown at 100 in accordance with conventional molding practice and in order to reduce the weight of the assembly. The cover plate is secured to the lower edges of the frame members 6 by suitable fasteners 92.

Additional sealing of the system is achieved by means of a peripheral gasket 98 mounted in a recess 99 in the wall portion of the cover plate and by means of gaskets 57 in the undersides of the receptacle plates 56. Each gasket 57 completely surrounds the entire group of receptacle openings 60 in each receptacle plate thereby sealing the interfaces between the panelboard surface 74 and the undersides of the receptacle plates.

The previously identified vents assist in maintaining the circumferential seals of the individual connectors when the junction system is provided on an aircraft as follows: The junction system is installed while the aircraft is on the ground and the pressure inside of the connectors is at the atmospheric level. When the aircraft ascends to a high altitude, the ambient pressure is greatly reduced and gases in the connector, contained by the sealing gland, will escape to some extent because of the pressure differential. Upon descent of the aircraft, the interiors of the connectors will be at a pressure below ambient pressure and there will be a tendency for air to penetrate the seal formed by the sealing gland. However, the atmospheric pressure imposed on the external surface of the skirt of the sealing gland will press the internal surface of the gland against surface 64 and minimize this flow of air into the system. In this manner, the tendency of the system to "breathe" is reduced and the detrimental effects of breathing are largely avoided.

The circular connectors 54 are mounted in the lefthand enclosure of the frame structure by means of their integral flanges 102 which are secured to the upper surface of the panelboard by suitable fasteners 104. These circular connector receptacles 54 are provided with conventional insulating inserts in which there are provided a plurality of contact receiving cavities as shown. The contact terminals in these cavities may be suitably wired to the terminal posts 76 in any desired manner. The provision of the circular connectors permits the use of conventional circular connectors 18 which are sometimes, of necessity, provided with equipment and which must be integrated into the junction system. It should be added at this point that any other type of connector may be integrated in this manner, for example, a rack and panel aircraft connector, in which case one part of the connector would be mounted in the frame means and the other part would be disengageably coupled to the first part.

An important feature of the invention, which gives rise to many of the advantages thereof, is the fact that the individual connectors 16 can be removed from the frame 2 without disturbing the panelboard 68, the panelboard, on the other hand, can be removed from the frame without disturbing the individual connectors (excepting the circular connectors if these are conventional types having locking ring means). This feature is achieved by virtue of the fact that the panelboard 68 is precisely located in the frame, as discussed above, by careful manufacture of the side rails and the transverse frame members 6, 8 of the frame and by careful manufacture of the panelboard itself. The terminal posts are precisely located on the panelboard so that when the panelboard is mounted in the frame, the terminal posts are located with respect to the frame. Additionally, the individual rectangular connectors are precisely located when they are assembled to the frame by virtue of the fact that the receptacle plate 56 is precisely located and dimensioned and the guide surfaces 64 are accurately located with respect to the frame. It follows that when an individual connector is mounted on or assembled to the frame, the individual contact terminal in the connector will move along precisely predetermined paths towards the panelboard and, therefore, will move over the upper ends 72 of the contact terminal posts 66. The frame (of which the receptacle plates 56 are a part) thus functions as a common locating and aligning means for both the panelboard and the individual rectangular connectors and provides guide means for both the panelboard and the connectors when they are assembled to the frame in order to ensure mating of the upper ends of the posts of the contact terminals in the connectors. In the embodiment of the invention shown in FIGS. 1–8, surface portions of the frame provide function as the guide means and the aligning means for the panelboard and the connectors. An alternative embodiment of the invention is described below in which additional guiding and aligning means are provided on the frame for the same purposes.

The removability of the connectors and/or the panelboard from the frame means results in the achievement of several advantages which are not available in previous electrical junction systems. For example, during the assembly of an aircraft, it is necessary to form interconnections between the conductors or harnesses extending from the electrically controlled parts of the aircraft (the engines, the landing gear, the lights, etc.) and the instruments in the cockpit. In the past, this has commonly been done with conventional circular or rack and panel connectors on the ends of the harnesses extending from the various parts of the aircraft to the junction area. In accordance with the present invention, the frame means 2 can be mounted in a conveniently located panel 4 of the aircraft at an early stage of construction. As the various parts of the aircraft having electrical controls are added thereto, the harnesses or cables extending from those parts of the aircraft can be led to the junction area and the connectors 16 on the ends of these cables can be mounted in the frame thereby protecting them from damage. As a final step in the wiring, and after all of the connectors have been mounted in the frame means, the panelboard 68 can be assembled to the frame means to form the interconnections between the conductors. The underside of the panelboard can be machine wired by any suitable automatic point-to-point wiring automatic technique, for example, by a clip type or wrap type wiring machine under the influence of a numerical control apparatus. It will be realized that other types of interconnections on the lower side of the panelboard 68 can also be used if desired, for example, printed circuit wiring paths.

The invention provides added advantages where electrical system servicing must be carried out. If for example, one of the engines of the aircraft is to be replaced, the electrical connectors 16 to which the harness from the engine being replaced extend can simply be removed from the frame without disturbance to the panelboard or to the remaining connectors. When the new engine is installed, the required interconnections can be formed by merely assemblying the connectors on the new engine to the frame means. If the panelboard must be removed for servicing or rewiring, or any other purpose, it can be taken out without disturbing any of the electrical connectors and it can be replaced immediately by a previously wired panel with a minimum of service interruption. It will also be apparent that changes in the wiring can be affected by merely removing one panelboard 68 and replacing it with a panelboard having the desired changes in its interconnection wiring 80, 82.

The specific embodiment of the invention shown has several specific advantages in addition to the general advantages enumerated above. For example, any of the presently available commonly used types of conductors can be accommodated such as flat conductor cable, twisted wire pairs, ribbon cable, or conventional insulated wires. The disclosed form of the invention thus provides an interface for all types of electrical conductors which might be used on a given piece of equipment. A high degree of sealing is achieved in accordance with the disclosed embodiment by virtue of the fact that both sides of the panelboard are sealed and additionally the individual connectors are sealed by the sealing glands 40. Vibration stressing of the lower ends of the terminal posts is avoided in the disclosed embodiment, as noted above, by virtue of the fact that the ends of these posts are contained in the recesses of the cover plate so that they cannot be flexed beyond the confines of the recesses.

The instant invention lends itself to the latest wiring techniques in that each position, that is each terminal post 66, on the panelboard is identified as the terminal position of one of the conductors extending to the system because of the fact that each conductor extending to the system is specifically located in a predetermined connector 16 which is uniquely keyed to only one position in the frame. The interconnections between the conductors extending to the system can thus be formed by a numerically controlled wiring machine such as the wiring machine shown in the patent to Vickery U.S. Pat. No. 3,186,077. The necessity of painstaking and tedious identification of each wire in the junction system, when the interconnections are made, is thus avoided with an accompanying reduction in the possibility of error.

It was previously noted that the types of circular connectors 18 shown must be removed from the frame before the panelboard can be removed inasmuch as these connectors 18 are not secured to the frame. Provision is made for these conventional circular connectors in the disclosed embodiment in order to allow for the integration of such connectors into the junction system. However, it would also be entirely practical to mount these connectors 18 on a plate which would be part of the frame at a location such that the contacts in the connectors would be precisely located so that they would be engaged with similar contact terminals mounted on the panelboard. As also noted above, conventional rectangular racket panel connectors might be mounted in the frame means rather than circular connectors as shown.

The frame 2 can be mounted in a horizontal panel or a vertical panel as convenience dictates. Alternatively the frame can be otherwise mounted, for example, it can simply be clamped at a convenient location on a support surface and unclamped when removal of the panelboard is necessary.

Electrical junction systems in accordance with the invention can be made any desired size. The system shown in FIG. 1 provides a junction for approximately 500 conductors but larger systems capable of forming interconnections among much greater numbers of conductors can be used. On the other hand, smaller junction systems in accordance with the invention can be used to advantage on equipment having relatively simple electrical systems such as road vehicles, computer equipment, and machine control equipment. The general advantages discussed above, of convenience is the assembly of the equipment and serviceability, would be achieved in all instances.

Figure 8:
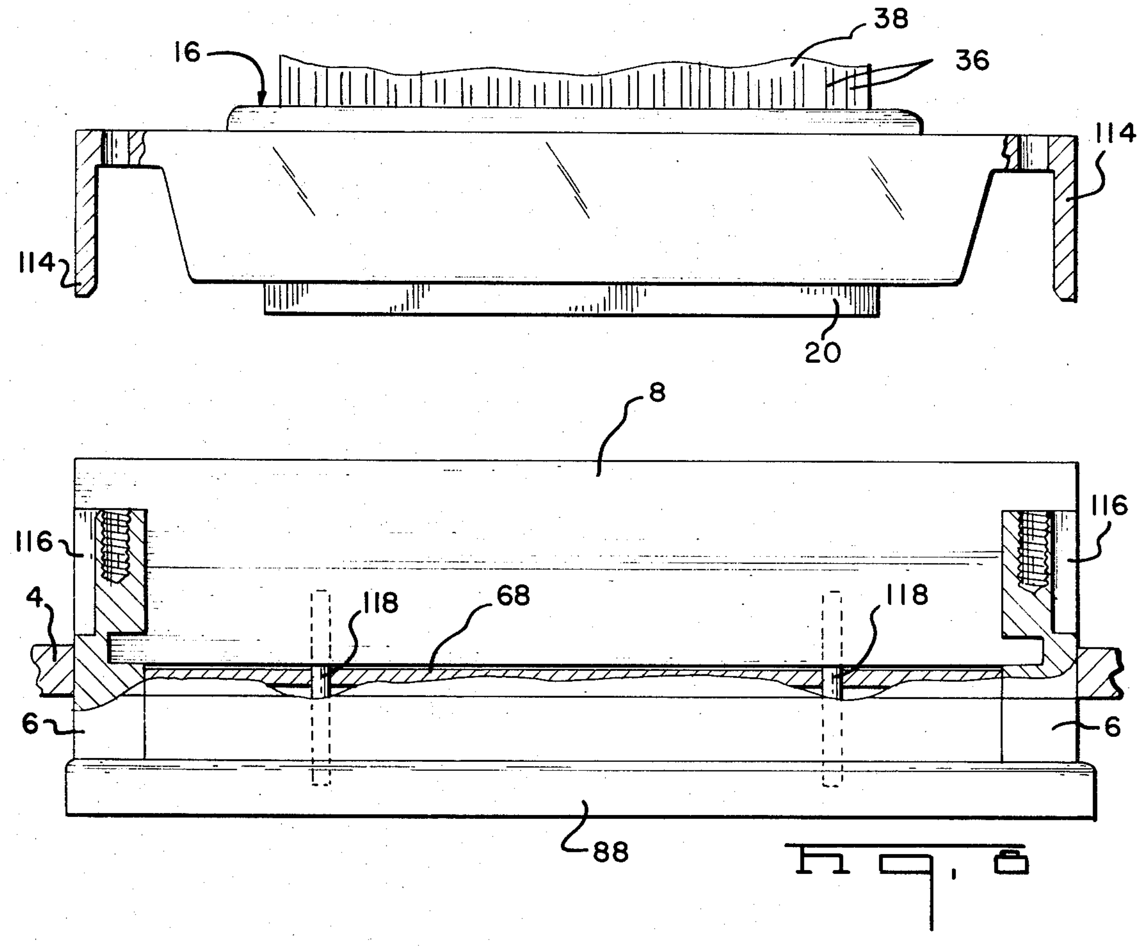
FIG. 8 is a view similar to FIG. 3 but showing an alternative embodiment of the invention.
Figure 9:
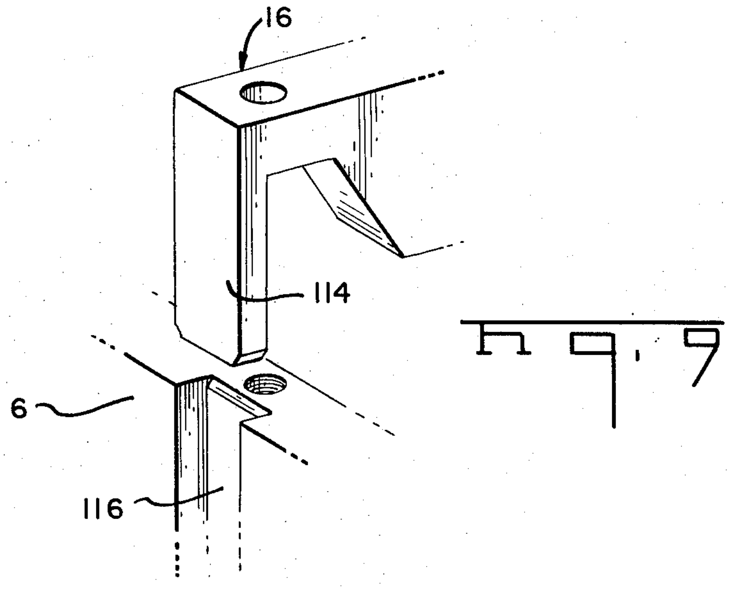
FIG. 9 is a fragmentary view illustrating a guide means for the connectors of the embodiment of FIG. 8.

FIGS. 8 and 9 show an alternative embodiment of the invention having alternative guide and locating means for the connectors and the panelboard. The locating and guide means for the panelboard in this embodiment comprises guide pins 118 mounted in the transverse frame members 8 which extend through precisely located holes in the panelboard. The locating and guide means for the connectors comprises arms 114 which extend downwardly from the ears 50 on the ends of the shell members and which are received in slots 116 in the outer surfaces of the side rails.

Changes in construction will occur to those skilled in the art and various apparently different modifications and embodiments may be made without departing from the scope of the invention. The matter set forth in the foregoing description and accompanying drawings is offered by way of illustration only.

We claim:

1. An electrical junction system for interconnecting a multiplicity of first conductors extending to said system comprising:

a plurality of electrical connectors, first contact terminals in said connectors, said first conductors extending to, and secured to, said first contact terminals, a panelboard having second contact terminals mounted therein and extending therethrough, each of said second contact terminals having a first end on one side of said panelboard and having a second end on the other side of said panelboard, the said first end of each of said second contact terminals being adapted to be disengageably coupled with one of said first contact terminals, said second contact terminals being located on said panelboard in positions corresponding to the locations of said first contact terminals in said connectors whereby said first and second contact terminals can be disengageably coupled, second conductors on said other side of said panelboard connecting said second ends of said second contact terminals thereby to form interconnections among said first conductors, and frame means for mounting said connectors and said panelboard, said frame means having first locating means for locating said connectors and second locating means for locating said panelboard, said first and second locating means being effective to locate said first and second contact terminals at predetermined locations relative to said frame means, whereby, said panelboard can be removed from, and assembled to, said frame means while said connectors are mounted thereon, and said connectors can be individually removed from, and assembled to, said frame means while said panelboard is mounted thereon.

2. A junction system as set forth in claim 1 wherein said first and second locating means comprises guide pins mounted on said frame means.

3. A junction system as set forth in claim 1 wherein said frame means comprises a metallic frame structure having a central opening, said panelboard and said connectors extending into said opening from opposite sides thereof, said locating means comprising surface portions of said frame structure.

4. A junction system as set forth in claim 1 wherein said frame means comprises a pair of parallel side rails and transverse frame members secured to, and extending between said side rails, receptacle plate means forming part of said frame structure and having receptacles thereon for mating with said connectors, said receptacles constituting said first locating means.

5. A junction system as set forth in claim 4 including sealing means effective between said panelboard and said frame means, between said receptacle plate means and said panelboard, and between said conductors and said connectors whereby said system is sealed from the atmosphere.

6. A junction system as set forth in claim 1 wherein at least some of said conductors comprise flat conductors in flat conductor cables.

7. A junction system as set forth in claim 1 wherein said second contact terminals comprise terminal posts mounted on, and extending through, said panelboard, said second conductors comprising wires connected to said posts on said other side of said panelboard.

8. A junction system as set forth in claim 1 including cover means mounted on said frame means in covering relationship to said panelboard.

9. A junction system as set forth in claim 8 wherein said second contact terminals comprise terminal posts mounted in, and extending through, said panelboard, recesses in said cover means at locations corresponding to the locations of said second contact terminals, said second ends of said second contact terminals being received in said recesses to stabilize, and limit the flexure of, said second contact terminals.

10. Electrical junction means for interconnecting a multiplicity of first conductors which extend to a plurality of multi-contact electrical connectors and which are secured to first contact terminals in said connectors, said junction means comprising:

frame means defining a reference plane, said frame means being adapted to receive said connectors on one side of said reference plane, first locating and guide means on said frame means on said one side of said reference plane, said first locating and guide means being effective to guide said connectors individually towards said frame means on said one side normally of said plane and to locate said connectors precisely in said frame means whereby said first contact terminals are precisely located with respect to said frame means, interconnecting means removably mounted in said frame means, said interconnecting means comprising a panel-like member having second contact terminals therein for engagement with said first contact terminals upon assembly of said connectors to said frame means, said interconnecting means having conductors extending between said contact terminals thereby to form interconnections among said first contact terminals, and second locating and guide means for guiding said panel-like member normally towards said frame means on the side of said reference plane which is opposite to said one side and for locating said panel-like member precisely on said frame means whereby, said connectors can be mounted on, and removed from, said frame means when said interconnecting means is mounted on said frame means, and said interconnecting means can be removed from, and assembled to, said frame means when said connectors are mounted thereon.

11. Electrical junction means as set forth in claim 10 wherein said interconnecting means comprises a panelboard.

12. Electrical junction means as set forth in claim 10 wherein said interconnecting means comprises a panelboard and said second contact terminals comprise terminal posts.

13. Electrical junction means as set forth in claim 10 wherein said first and second locating means comprises surface portions of said frame means.

14. Electrical junction means as set forth in claim 10 wherein said first and second locating means comprises guide pins.

15. A frame adapted to receive a plurality of electrical connectors and to receive a panelboard for forming interconnections among the conductors in said connectors, said frame defining a reference plane and having thereon:

supporting means for supporting said connectors and said panelboard in opposed relationship on opposite sides of said reference plane with first contact terminals in said connectors coupled to second contact terminals in said panelboard, first guiding and locating means on one side of said frame for individually guiding each of said connectors normally of said reference plane towards said frame to a predetermined location with respect to said frame upon assembly of said connectors to said frame, whereby each of said first contact terminals is located at a predetermined position with respect to said frame, second guiding and locating means on the side of said reference plane which is opposite to said one side for guiding said panelboard normally of said reference plane towards said frame to a predetermined location with respect to said frame upon assembly of said panelboard to said frame, said frame comprising parallel side rails and transversely extending end members, said connectors and said panelboard being adapted to be received between said side rails, said first and second guiding and locating means comprising surface portions of said frame whereby
each of said second contact terminals is located at a predetermined position with respect to said frame, said predetermined positions of said first and second terminals coinciding and said first and second terminals being disengageably coupled when said connectors and said panelboard are mounted on said frame.

16. A frame as set forth in claim 15 including receptacle plate means extending between said side rails, said receptacle plate means having openings therein to permit contact terminals to extend therethrough, wall means integral with said receptacle plate means surrounding said openings, surface portions of said wall means comprising said first guiding and locating means.

17. Electrical junction means for interconnecting a multiplicity of conductors comprising:

a generally rectangular frame having spaced-apart parallel side rails and end members, a plurality of transversely extending dividing members extending between said side rails and dividing the interior of said frame into a plurality of enclosures, a receptacle plate in each of said enclosures extending between said side rails and said dividing members, a plurality of parallel openings in each of said receptacle plates, wall means surrounding each of said openings, a panelboard mounted in said frame, said panelboard having a plurality of contact terminal posts mounted therein and extending therethrough, each of said posts having one end extending into one of said openings, said panelboard being precisely located in said frame by surface portions of said side rails and said end members whereby each of said terminal posts occupies a precisely predetermined position with respect to said frame, a plurality of connectors mounted on said frame, each of said connectors comprising an insulating housing, a sealing gland surrounding said housing and a shell surrounding said sealing gland, a plurality of contact terminal members in said housing, each of said housings extending into one of said openings and being precisely located with respect to said frame by internal surface portions of the said wall surrounding the said opening whereby each of said contact terminals in said connectors are precisely located with respect to said frame, said contact terminals being disengageably coupled to said terminal posts, said sealing glands being between external surface portions of said wall and internal surface portions of said shells, said shells being secured to said frame, a cover plate on said frame in covering relationship to said panelboard and secured to said frame, and sealing means comprising said sealing glands and sealing gaskets between said panelboard and said receptacle plates and between said panelboard and said cover plate, said connectors being individually removable from, and pluggable into, said frame when said panelboard is mounted therein and said panelboard being removable from, and mountable in, said frame when said connectors are mounted thereon.

* * * * *